US011984080B2

(12) United States Patent
Chen et al.

(10) Patent No.: US 11,984,080 B2
(45) Date of Patent: May 14, 2024

(54) PIXEL COMPENSATION CIRCUIT AND DRIVING METHOD THEREFOR, AND DISPLAY APPARATUS

(71) Applicant: BOE Technology Group Co., Ltd., Beijing (CN)

(72) Inventors: Yi Chen, Beijing (CN); Xing Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/028,925

(22) PCT Filed: Oct. 22, 2021

(86) PCT No.: PCT/CN2021/125656
§ 371 (c)(1),
(2) Date: Mar. 28, 2023

(87) PCT Pub. No.: WO2022/160799
PCT Pub. Date: Aug. 4, 2022

(65) Prior Publication Data

US 2023/0335054 A1 Oct. 19, 2023

(30) Foreign Application Priority Data

Jan. 26, 2021 (CN) ......................... 202110102580.5

(51) Int. Cl.
*G09G 3/3233* (2016.01)
*G09G 3/00* (2006.01)
(Continued)

(52) U.S. Cl.
CPC ........... *G09G 3/3233* (2013.01); *G09G 3/006* (2013.01); *G09G 3/3208* (2013.01);
(Continued)

(58) Field of Classification Search
CPC ................. G09G 3/3233; G09G 3/006; G09G 2300/0852; G09G 2310/08;
(Continued)

(56) References Cited

U.S. PATENT DOCUMENTS

2015/0029171 A1 1/2015 Jo
2015/0294626 A1 10/2015 Bi et al.
(Continued)

FOREIGN PATENT DOCUMENTS

CN 104700761 A 6/2015
CN 105741761 A 7/2016
(Continued)

OTHER PUBLICATIONS

CN202110102580.5 first office action.
(Continued)

*Primary Examiner* — Douglas M Wilson
(74) *Attorney, Agent, or Firm* — IPro, PLLC

(57) ABSTRACT

A pixel compensation circuit includes: a pixel driving circuit including a driving transistor; a detection signal line coupled to the pixel driving circuit and providing a reset signal to a source of the driving transistor or receiving a source voltage of the driving transistor; a sampling module including a switch unit coupled to the detection signal line, a first and second storage units coupled to the switch unit enabling the first storage unit to be connected to the detection signal line, the first storage unit storing a voltage on the detection signal line and taking same as a reference voltage, and enabling the second storage unit to be connected to the detection signal line, the second storage unit storing the source voltage; a comparison and calculation module coupled to the first and second storage units, generates sampling data according to the difference between the reference voltage and the source voltage.

20 Claims, 4 Drawing Sheets

(51) Int. Cl.
*G09G 3/3208* (2016.01)
*G09G 3/3225* (2016.01)

(52) U.S. Cl.
CPC ... *G09G 3/3225* (2013.01); *G09G 2300/0852* (2013.01); *G09G 2310/0294* (2013.01); *G09G 2310/08* (2013.01); *G09G 2320/02* (2013.01); *G09G 2320/0233* (2013.01); *G09G 2320/0295* (2013.01); *G09G 2320/045* (2013.01); *G09G 2330/12* (2013.01)

(58) Field of Classification Search
CPC ....... G09G 2320/0233; G09G 2330/12; G09G 2320/0295; G09G 2320/045; G09G 3/3208; G09G 2320/02; G09G 3/3225; G09G 2310/0294
See application file for complete search history.

(56) References Cited

U.S. PATENT DOCUMENTS

| | | | | |
|---|---|---|---|---|
| 2016/0189625 | A1 | 6/2016 | Kim et al. | |
| 2017/0032738 | A1* | 2/2017 | Lee | G09G 3/3233 |
| 2017/0053590 | A1 | 2/2017 | Song et al. | |
| 2018/0061293 | A1 | 3/2018 | Park | |
| 2018/0061329 | A1* | 3/2018 | Lee | G09G 3/3258 |
| 2020/0135094 | A1 | 4/2020 | Chen et al. | |
| 2020/0160781 | A1 | 5/2020 | Park | |
| 2020/0193905 | A1 | 6/2020 | Yoon et al. | |
| 2020/0202777 | A1 | 6/2020 | Lee et al. | |
| 2020/0211458 | A1 | 7/2020 | He et al. | |
| 2021/0056890 | A1* | 2/2021 | Kim | G09G 3/32 |
| 2021/0193044 | A1 | 6/2021 | Meng et al. | |
| 2021/0366388 | A1 | 11/2021 | Song | |
| 2021/0375207 | A1 | 12/2021 | Chen et al. | |
| 2022/0068198 | A1 | 3/2022 | Yang et al. | |

FOREIGN PATENT DOCUMENTS

| | | | |
|---|---|---|---|
| CN | 107799063 | A | 3/2018 |
| CN | 108597449 | A | 9/2018 |
| CN | 108615505 | A | 10/2018 |
| CN | 108877685 | A | 11/2018 |
| CN | 109377943 | A | 2/2019 |
| CN | 110111713 | A | 8/2019 |
| CN | 110349542 | A | 10/2019 |
| CN | 110969989 | A | 4/2020 |
| CN | 111199708 | A | 5/2020 |
| CN | 111326113 | A | 6/2020 |
| CN | 111951734 | A | 11/2020 |
| CN | 112863440 | A | 5/2021 |
| KR | 20180065678 | A | 6/2018 |

OTHER PUBLICATIONS

CN202110102580.5 second office action.
CN202110102580.5 Decision of Rejection.
PCT/CN2021/125656 international search report.

* cited by examiner

PIXEL COMPENSATION CIRCUIT AND DRIVING METHOD THEREFOR, AND DISPLAY APPARATUS

CROSS REFERENCE TO RELATED APPLICATION

The present application is a National Stage of International Application No. PCT/CN2021/125656, filed on Oct. 22, 2021, which claims the priority to Chinese Patent Application No. 202110102580.5, filed to the Chinese Patent Office on Jan. 26, 2021 and entitled "PIXEL COMPENSATION CIRCUIT AND DRIVING METHOD THEREFOR, AND DISPLAY APPARATUS", both of which are incorporated herein in their entireties by reference.

FIELD

The present disclosure relates to the technical field of display, in particular to a pixel compensation circuit, a method for driving same and a display apparatus.

BACKGROUND

Featuring self-luminescence and low energy consumption, organic light emitting diodes (OLED) and other electroluminescent diodes have become a focus of recent application research on electroluminescent display panels at present. Luminescent display of OLED display products is controlled by controlling a current flowing through the OLED. In display structures, due to inconsistency in process conditions and driving environment, drive currents of thin-film transistors (TFT) caused by the same data voltage vary, and deviation in brightness of light-emitting devices is caused consequently. As a result, it is necessary to compensate for the drive TFT. In the related art, a test on the TFT is required to compensate for the drive TFT, and test precision is likely to be affected by the parasitic capacitive effect in the display structure and noise of a circuit system, which results in influence on compensation accuracy and display image quality accordingly.

SUMMARY

An embodiment of the present disclosure provides a pixel compensation circuit. The pixel compensation circuit includes: a pixel drive circuit including a drive transistor; a test signal line that is coupled to the pixel drive circuit, is configured to provide a reset signal for a source of the drive transistor at a reset stage and is configured to receive a source voltage of the drive transistor at a charging stage after the reset stage; a sampling module including a switch unit coupled to the test signal line, and a first storage unit and a second storage unit that are coupled to the switch unit, where the switch unit is configured to cause, at the reset stage, the first storage unit to be in communication with the test signal line, so as to cause the first storage unit to store a voltage on the test signal line as a reference voltage, and cause, at a sampling stage after the charging stage, the second storage unit to be in communication with the test signal line, so as to cause the second storage unit to store a source voltage of the drive transistor; and a comparison and computation module that is coupled to the first storage unit and the second storage unit, and is configured to generate, at the sampling stage, sampled data according to a difference between the reference voltage stored in the first storage unit and the source voltage of the drive transistor stored in the second storage unit.

In some embodiments, the pixel compensation circuit further includes: a sampling capacitor configured to store, at the charging stage, the source voltage of the drive transistor received by the test signal line, where a first pole of the sampling capacitor is coupled to the test signal line, and a second pole of the sampling capacitor is grounded.

In some embodiments, the first storage unit includes: a first storage capacitor, a first pole of the first storage capacitor being coupled to the switch unit and a first input end of the comparison and computation module, and a second pole of the first storage capacitor being grounded; and the second storage unit includes: a second storage capacitor, a first pole of the second storage capacitor being coupled to the switch unit and a second input end of the comparison and computation module, and a second pole of the second storage capacitor being grounded.

In some embodiments, the switch unit includes: a first one-way control switch, a first end of the first one-way control switch being coupled to the test signal line, and a second end of the first one-way control switch being coupled to the first storage unit; and a second one-way control switch, a first end of the second one-way control switch being coupled to the test signal line, and a second end of the second one-way control switch being coupled to the second storage unit.

In some embodiments, the switch unit includes: a first one-way control switch, a first end of the first one-way control switch being coupled to the test signal line; and a multi-way selector switch, where an input end of the multi-way selector switch is coupled to a second end of the first one-way control switch, the multi-way selector switch includes a first output end and a second output end, the first output end is coupled to the first storage unit, and the second output end is coupled to the second storage unit.

In some embodiments the comparison and computation module includes: a differential digital-to-analog converter, where a first input end of the differential digital-to-analog converter is coupled to the first storage unit, a second input end of the differential digital-to-analog converter is coupled to the second storage unit, and the differential digital-to-analog converter is configured to perform differential processing on the reference voltage stored in the first storage unit and the source voltage of the drive transistor stored in the second storage unit to generate the sampled data.

In some embodiments, the pixel drive circuit further includes: a data writing transistor, a gate of the data writing transistor being coupled to a first scanning signal end, a source of the data writing transistor being coupled to a data signal end, and a drain of the data writing transistor being coupled to a gate of the drive transistor; a sensing transistor, a gate of the sensing transistor being coupled to a second scanning signal end, a source of the sensing transistor being coupled to the test signal line, and a drain of the sensing transistor being coupled to the source of the drive transistor; a third storage capacitor, a first pole of the third storage capacitor being coupled to the gate of the drive transistor, and a second pole of the third storage capacitor being coupled to the source of the drive transistor; and a light-emitting device, an anode of the light-emitting device being coupled to the source of the drive transistor.

In some embodiments, the pixel compensation circuit further includes: a timing control module that is coupled to the comparison and computation module, and is configured to generate a compensation signal according to sampled data obtained by the comparison and computation module, and provide a data signal for the pixel drive circuit according to the compensation signal.

The embodiment of the present disclosure provides a display apparatus. The display apparatus includes the pixel compensation circuit according to the embodiment of the present disclosure.

The embodiment of the present disclosure provides a method for driving a pixel compensation circuit. The method includes: at a reset stage, inputting a data signal into a gate of a drive transistor, providing a reset signal for a source of the drive transistor through a test signal line, and controlling a switch unit to cause a first storage unit to be in communication with the test signal line, and store a voltage on the test signal line in the first storage unit as a reference voltage; at a charging stage, inputting a data signal into the gate of the drive transistor, and controlling the drive transistor to be turned on to charge the test signal line; and at a sampling stage, controlling the switch unit to cause a second storage unit to be in communication with the test signal line, and store a source voltage of the drive transistor received at the charging stage by the test signal line in the second storage unit, and generating, by a comparison and computation module, sampled data according to a difference between the reference voltage stored in the first storage unit and the source voltage of the drive transistor stored in the second storage unit.

In some embodiments, the pixel drive circuit further includes a sampling capacitor, and at a charging stage, the method includes: charging the test signal line, and further includes: charging the sampling capacitor.

In some embodiments, the switch unit includes a first one-way control switch and a second one-way control switch; at a reset stage, the controlling a switch unit to cause a first storage unit to be in communication with the test signal line specifically includes: controlling the first one-way control switch to be switched on, and simultaneously controlling the second one-way control switch to be switched off, so as to cause the first storage unit to be in communication with the test signal line; and at a sampling stage, the controlling the switch unit to cause a second storage unit to be in communication with the test signal line specifically includes: controlling the first one-way control switch to be switched off, and simultaneously controlling the second one-way control switch to be switched on, so as to cause the second storage unit to be in communication with the test signal line.

In some embodiments, the switch unit includes a first one-way control switch and a multi-way selector switch; at a reset stage, the controlling a switch unit to cause a first storage unit to be in communication with the test signal line specifically includes: controlling the first one-way control switch to be switched on, and simultaneously controlling an input end and a first output end of the multi-way selector switch to be in communication, so as to cause the first storage unit to be in communication with the test signal line; and at a sampling stage, the controlling the switch unit to cause a second storage unit to be in communication with the test signal line specifically includes: controlling the first one-way control switch to be switched on and simultaneously controlling the input end and a second output end of the multi-way selector switch to be in communication, so as to cause the second storage unit to be in communication with the test signal line.

In some embodiments, the pixel drive circuit further includes a data writing transistor and a sensing transistor; at a reset stage, the inputting a data signal into a gate of a drive transistor specifically includes: loading a first level signal onto a first scanning signal end, controlling the data writing transistor to be turned on, and loading the data signal onto a data signal end, so as to input the data signal into the gate of the drive transistor; the providing a reset signal for a source of the drive transistor through a test signal line specifically includes: loading the first level signal onto a second scanning signal end, controlling the sensing transistor to be turned on, and providing the reset signal for the test signal line, so as to input the reset signal into the source of the drive transistor.

In some embodiments, after the sampling stage, the method further includes: at a compensation stage, compensating for a data signal of a pixel drive circuit according to the sampled data.

BRIEF DESCRIPTION OF THE DRAWINGS

To describe technical solutions of embodiments of the present disclosure more clearly, accompanying drawings required for description of the embodiments will be briefly described below. Apparently, the accompanying drawings in the following description are merely some embodiments of the present disclosure, and a person of ordinary skill in the art can derive other accompanying drawings from these accompanying drawings without creative efforts.

DETAILED DESCRIPTION OF THE EMBODIMENTS

Figure 1:
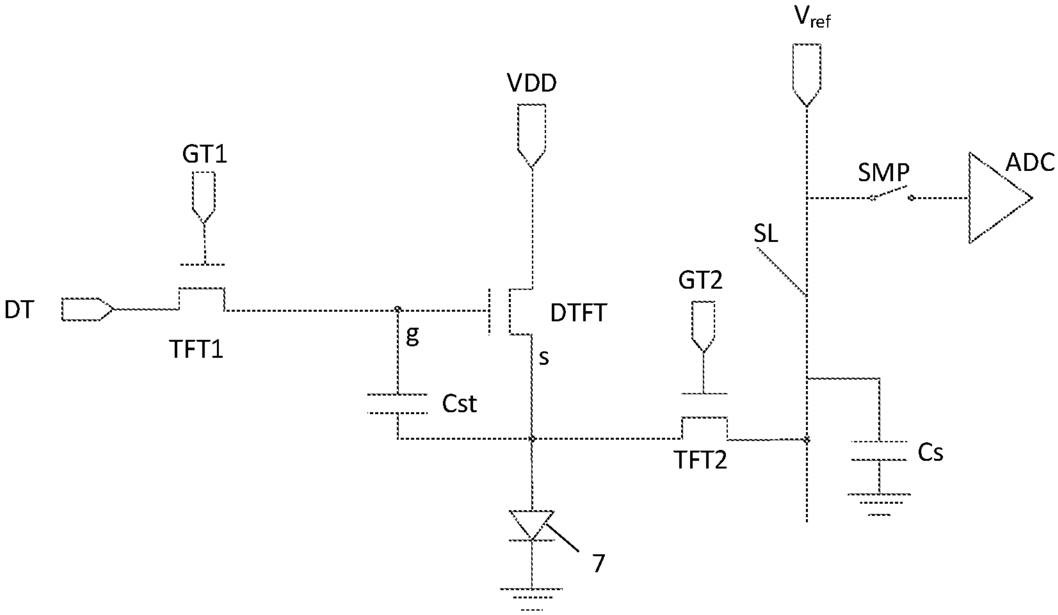
FIG. 1 is a schematic structural diagram of a pixel compensation circuit according to the related art.

In order to make objectives, technical solutions and advantages of embodiments of the present disclosure clearer, the technical solutions of the embodiments of the present disclosure will be clearly and completely described with reference to accompanying drawings of the embodiments of the present disclosure. Apparently, the described embodiments are some embodiments rather than all embodiments of the present disclosure. In addition, the embodiments in the present disclosure and features in the embodiments can be combined mutually in the case of no conflict. All other embodiments derived by a person of ordinary skill in the art from the described embodiments of the present disclosure without creative efforts shall fall within the protection scope of the present disclosure.

Unless otherwise defined, technical terms or scientific terms used in the present disclosure should have ordinary meanings understandable by a person of ordinary skill in the field to which the present disclosure belongs. Words such as "first", "second" used in the present disclosure do not denote any order, quantity, or importance, but are merely used to distinguish between different components. Words such as "comprise" "include" or "encompass" are intended to mean that an element or item in front of the word encompasses elements or items enumerated behind the word and equivalent thereof, but does not exclude other elements or items. Words such as "connection", "connected" are not limited to physical or mechanical connections, but can include an electrical connection that is direct or indirect.

It should be noted that a size and a shape of each figure in the accompanying drawings do not reflect true scales, and are merely to illustrate contents of the present disclosure. Identical or similar reference numerals denote identical or similar elements or elements having identical or similar functions throughout.

In the related art, as shown in FIG. 1, a pixel compensation circuit includes a pixel drive circuit, a test signal line SL, a switch SMP, a sampling capacitor Cs, and an analog-to-digital conversion module ADC. As shown in FIG. 1, in the related art, voltages on the test signal line SL are tested through sampling, and are converted into sampled data by the single-ended analog-to-digital conversion module ADC, and then a compensation signal of the drive transistor DTFT is determined according to the sampled data. However, the single-ended analog-to-digital conversion module ADC is likely to be affected by a parasitic capacitive effect and circuit system noise, thereby affecting test precision of the voltage on the test signal line SL and accuracy of sampled data generated by the analog-to-digital conversion module ADC.

Figure 2:
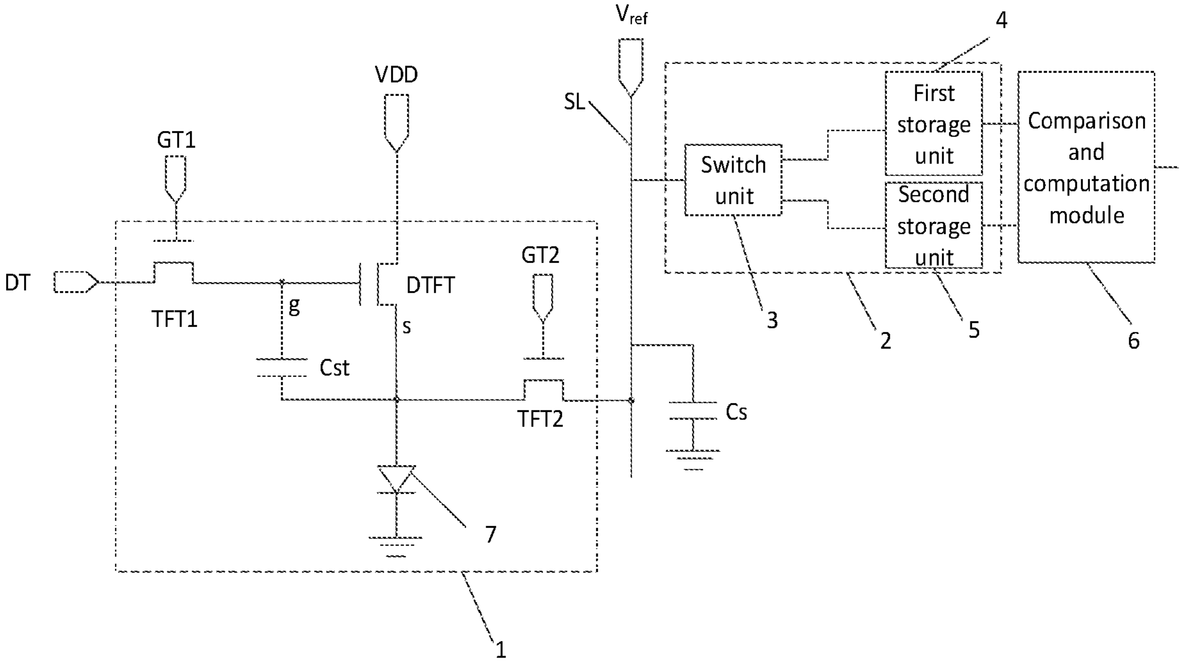
FIG. 2 is a schematic structural diagram of a pixel compensation circuit according to an embodiment of the present disclosure.

In order to solve the problems in related art, the embodiment of the present disclosure provides a pixel compensation circuit. As shown in FIG. 2, the pixel compensation circuit includes:

- a pixel drive circuit 1 including a drive transistor DTFT;
- a test signal line SL that is coupled to the pixel drive circuit 1, is configured to provide a reset signal for a source of the drive transistor DTFT at a reset stage and is configured to receive a source voltage of the drive transistor DTFT at a charging stage after the reset stage;
- a sampling module 2 including a switch unit 3 coupled to the test signal line SL, and a first storage unit 4 and a second storage unit 5 that are coupled to the switch unit, where the switch unit 3 is configured to cause, at the reset stage, the first storage unit 4 to be in communication with the test signal line SL, so as to cause the first storage unit 4 to store a voltage on the test signal line SL as a reference voltage, and cause, at a sampling stage after the charging stage, the second storage unit 5 to be in communication with the test signal line SL, so as to cause the second storage unit 5 to store a source voltage of the drive transistor DTFT; and
- a comparison and computation module 6 that is coupled to the first storage unit 4 and the second storage unit 5, and is configured to generate, at the sampling stage, sampled data according to a difference between the reference voltage stored in the first storage unit 4 and the source voltage of the drive transistor DTFT stored in the second storage unit 5.

Some embodiments of the present disclosure provides the pixel compensation circuit. The pixel compensation circuit includes the first storage unit and the second storage unit, the first storage unit stores the voltage on the test signal line SL as the reference voltage at the reset stage, the second storage unit stores the source voltage of the drive transistor DTFT at the sampling stage, the comparison and computation module generates the sampled data according to the difference between the reference voltage stored in the first storage unit and the source voltage of the drive transistor DTFT stored in the second storage unit, and then the compensation signal of the drive transistor may be determined according to the sampled data. Since the first storage unit and the second storage unit collect and store the voltage of the test signal line SL in one frame respectively, there is no variation in influence of an parasitic capacitive effect in the pixel compensation circuit or circuit noise on the test signal line SL when the first storage unit and the second storage unit collect the voltage, such that influence of the test signal line SL on voltage collection may be eliminated, sampling precision may be improved, precision of compensation for the drive transistor may be improved accordingly, and display quality and user experience may be improved.

In some embodiments, as shown in FIG. 2, the pixel compensation circuit further includes:

- a sampling capacitor Cs configured to store, at the charging stage, the source voltage of the drive transistor DTFT received by the test signal line SL, where a first pole of the sampling capacitor Cs is coupled to the test signal line SL, and a second pole of the sampling capacitor Cs is grounded.

In this way, at the charging stage, the sampling capacitor Cs stores the source voltage of the drive transistor DTFT received by the test signal line SL, and at the subsequent sampling stage, the voltage stored by the sampling capacitor Cs may be sampled, so as to store the source voltage of the drive transistor DTFT in the second storage unit.

Figure 3:
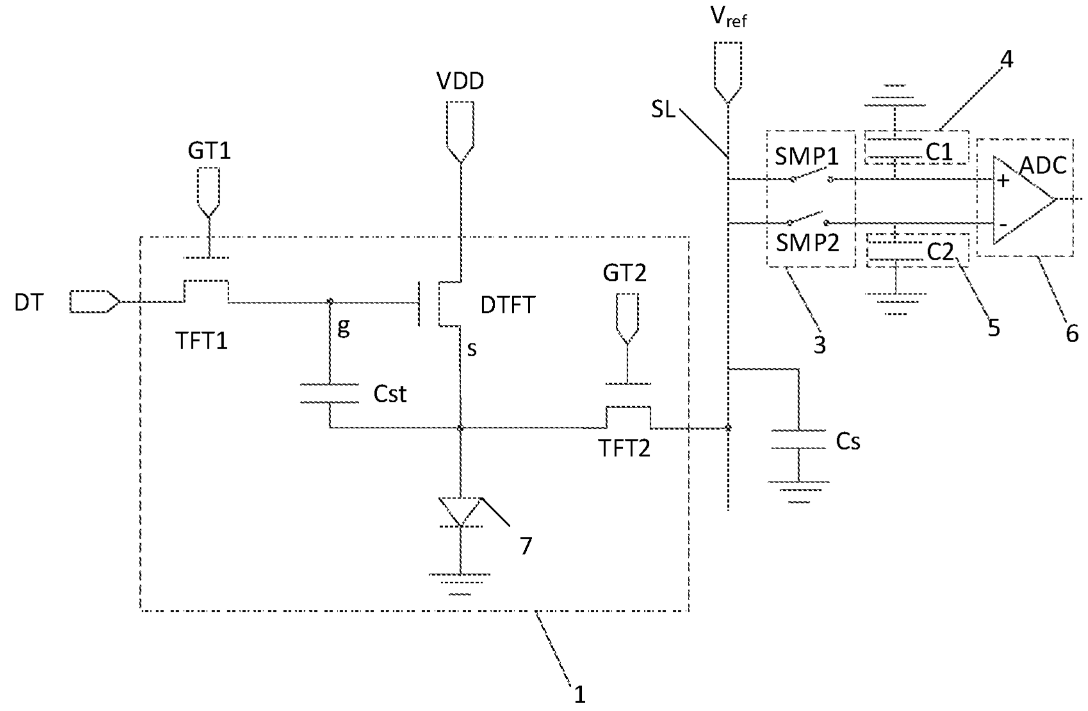
FIG. 3 is a schematic structural diagram of another pixel compensation circuit according to an embodiment of the present disclosure.

In some embodiments, as shown in FIG. 3, the first storage unit 4 includes:

- a first storage capacitor C1, a first pole of the first storage capacitor C1 being coupled to the switch unit 3 and a first input end of the comparison and computation module 6, and a second pole of the first storage capacitor C1 being grounded; and the second storage unit 5 includes:

- a second storage capacitor C2, a first pole of the second storage capacitor C2 is coupled to the switch unit 3 and a second input end of the comparison and computation module 6, and a second pole of the second storage capacitor C2 is grounded.

During specific implementation, at the reset stage, a collected voltage of the test signal line is stored in the first storage capacitor, and at the sampling stage, the collected voltage of the test signal line is stored in the second storage capacitor.

In some embodiments, as shown in FIG. 3, the switch unit 3 includes:

- a first one-way control switch SMP1, a first end of the first one-way control switch SMP1 being coupled to the test signal line SL, and a second end of the first one-way control switch SMP1 being coupled to the first storage unit 4; and
- a second one-way control switch SMP2, a first end of the second one-way control switch SMP2 being coupled to the test signal line SL, and a second end of the second one-way control switch SMP2 being coupled to the second storage unit 5.

During specific implementation, at the reset stage, the first one-way control switch SMP1 is switched on, and the second one-way control switch SMP2 is switched off, and a signal of the test signal line is stored in the first storage unit through the first one-way control switch SMP1. At the sampling stage, the first one-way control switch SMP1 is switched off, the second one-way control switch SMP2 is switched on, and the signal of the test signal line is stored in the second storage unit through the second one-way control switch SMP2. In the remaining stages, the first one-way control switch SMP1 and the second one-way control switch SMP2 are both switched off.

Figure 4:
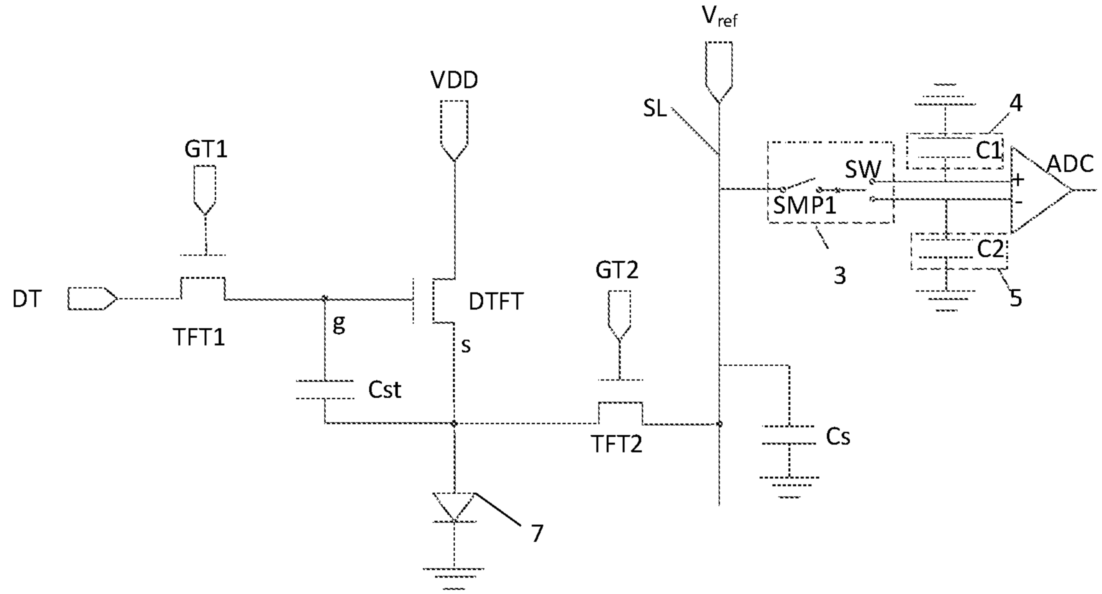
FIG. 4 is a schematic structural diagram of yet another pixel compensation circuit according to an embodiment of the present disclosure.

Alternatively, in some embodiments, as shown in FIG. 4, the switch unit 3 includes:

a first one-way control switch SMP1, a first end of the first one-way control switch SMP1 being coupled to the test signal line SL; and a multi-way selector switch SW, where an input end of the multi-way selector switch SW is coupled to a second end of the first one-way control switch SMP1, the multi-way selector switch SW includes a first output end and a second output end, the first output end is coupled to the first storage unit 4, and the second output end is coupled to the second storage unit 5.

During specific implementation, at the reset stage, the first one-way control switch SMP1 is switched on, the input end and the first output end of the multi-way selector switch SW are in communication, and a signal of the test signal line is stored in the first storage unit through the multi-way selector switch SW. At the sampling stage, the first one-way control switch SMP1 is switched on, the input end and the second output end of the multi-way selector switch SW are in communication, and the signal of the test signal line is stored in the second storage unit through the multi-way selector switch SW. In the remaining stages, the first one-way control switch SMP1 is switched off.

It should be noted that in the pixel compensation circuit shown in FIG. 3 according to the embodiment of the present disclosure, only one one-way control switch is arranged between each storage unit and the test signal line SL, such that a charge sharing speed between the storage capacitor and the sampling capacitor is fast, that is, the voltage of the test signal line may be stored in the storage capacitor quickly, and therefore a control signal with a small pulse width may be set to control the one-way control switch to be switched on or off. For the pixel compensation circuit as shown in FIG. 4, in addition to the one-way control switch arranged between each storage unit and the test signal line SL, the multi-way selector switch may be arranged, such that a charge sharing speed between the storage capacitor and the sampling capacitor is slower than the charge sharing speed in the case of only one switch, and it is necessary to increase the pulse width of the control signal of the one-way control switch compared with the case of only one switch.

In some embodiments, as shown in FIGS. 3 and 4, the comparison and computation module 6 includes:

a differential digital-to-analog converter ADC, where a first input end of the differential digital-to-analog converter ADC is coupled to the first storage unit 4, a second input end of the differential digital-to-analog converter ADC is coupled to the second storage unit 5, and the differential digital-to-analog converter is configured to perform differential processing on the reference voltage stored in the first storage unit 4 and the source voltage of the drive transistor DTFT stored in the second storage unit 5 to generate the sampled data.

The pixel compensation circuit according to the embodiment of the present disclosure uses the differential digital-to-analog converter, that is, the digital-to-analog converter is in a dual-input mode, which may eliminate influence of common-mode noise on voltage collection, improve collection precision of the digital-to-analog converter, and improve the compensation precision.

In some embodiments, as shown in FIGS. 2-4, the pixel drive circuit 1 further includes:

a data writing transistor TFT1, a gate of the data writing transistor TFT1 being coupled to a first scanning signal end GTFT1, a source of the data writing transistor TFT1 being coupled to a data signal end DT, and a drain of the data writing transistor TFT1 being coupled to a gate of the drive transistor DTFT;

a sensing transistor TFT2, a gate of the sensing transistor TFT2 being coupled to a second scanning signal end GT2, a source of the sensing transistor TFT2 being coupled to the test signal line SL, and a drain of the sensing transistor TFT2 being coupled to the source of the drive transistor DTFT;

a third storage capacitor Cst, a first pole of the third storage capacitor Cst being coupled to the gate of the drive transistor DTFT, and a second pole of the third storage capacitor Cst being coupled to the source of the drive transistor DTFT; and a light-emitting device 7, an anode of the light-emitting device 7 being coupled to the source of the drive transistor DTFT.

It should be noted that the drive transistor, the data writing transistor and the sensing transistor above may be thin-film transistors or metal-oxide-semiconductor field-effect transistor (MOS), and are not limited herein. The light-emitting transistor may be an OLED, for example. In the pixel compensation circuit shown in FIGS. 2-4 according to the embodiment of the present disclosure, the drain of the drive transistor DTFT is coupled to a power signal end VDD, and the drive transistor DTFT may be controlled to generate an operation current when the gate of the drive transistor DTFT is in a switch-on state.

It should be noted that the embodiment of the present disclosure is described by taking a pixel drive circuit including three transistors and one capacitor as an example, and the number of transistors and the number of capacitors in the pixel drive circuit may be selected according to actual needs.

In some embodiments, the pixel compensation circuit further includes:

a timing control module that is coupled to the comparison and computation module, and is configured to generate a compensation signal according to sampled data obtained by the comparison and computation module, and provide a data signal for the pixel drive circuit according to the compensation signal.

During specific implementation, in the case that the comparison and computation module includes a differential analog-to-digital converter, the differential analog-to-digital converter is coupled to the timing control module.

It should be noted that the obtained sampled data are related to a threshold voltage of the drive transistor, such that compensation data of the threshold voltage may be obtained according to the sampled data. During specific implementation, the timing control module may determine the compensation signal, such as a compensation signal of the data signal, for example, according to a correspondence between preset sampled data and the compensation data, and provide a data signal after compensation for the pixel drive circuit according to the compensation signal.

It should be noted that in the related art, when a single-ended analog-to-digital converter is used, in the case that sampling is required twice, for eliminating noise, second sampling needs to be performed after data backhaul between the analog-to-digital converter and the timing control module, and the data backhaul occupies a lot of blank time, thereby prolonging time at the sampling stage greatly and affecting sampling efficiency. In the pixel compensation circuit according to the embodiment of the present disclosure, data backhaul between the analog-to-digital converter and the timing control module is not required between sampling of the first storage unit and sampling of the second storage unit, thereby saving the blank time, improving sampling efficiency, and further improving pixel compensation efficiency.

An embodiment of the present disclosure provides a display apparatus. The display apparatus includes the pixel compensation circuit according to some embodiments of the present disclosure.

The display apparatus provided by the present disclosure may be, for example, an electroluminescent display apparatus, such as an OLED display apparatus.

In some embodiments, the display apparatus further includes a source driver and a gate driver. A timing control module includes a timing controller.

During specific implementation, the timing controller receives gray-scale data and timing control (TC) signals of sub-pixels input from the outside, and receives data output from the source driver with reference to a clock signal (ACLK) output by the source driver. After computation, conversion, compensation and other algorithms, at an operation stage of the OLED display apparatus, the timing controller generates a data signal and a source control signal (SCS) to be output to the source driver, and the timing controller generates a gate control signal (GCS) to be output to the gate driver.

The source driver receives the data signal and the source control signal SCS, generates a corresponding data voltage and outputs the data voltage to the pixel drive circuit through a data signal line coupled to a data signal end. The gate driver receives the gate control signal GCS, generates a corresponding scanning signal and outputs the scanning signal to the pixel drive circuit through a scanning signal line coupled to a scanning signal end. Through control over the source driver and the gate driver, the source driver tests an optical or electrical eigenvalue of the pixel drive circuit through a test signal line, and outputs sampled data to the timing controller through the source driver.

During specific implementation, the gate driver and the source driver may be, for example, a driver chip, the driver chip is electrically connected to a printed circuit board (PCB), and the PCB is electrically connected to the timing controller through a flexible printed circuit (FPC).

During specific implementation, the display apparatus includes a plurality of sub-pixels, and each sub-pixel may include the pixel drive circuit as shown in FIGS. 2-4. It is certain that the plurality of sub-pixels may also share a sensing transistor and the test signal line.

The display apparatus according to embodiments of the present disclosure is any product or component with a display function, such as a mobile phone, a tablet computer, a television, a display, a notebook computer, a digital photo frame and a navigator. Other essential components of the display apparatus shall be understood as necessary by those of ordinary skill in the art, are not repeated herein, and should not be regarded as limitation to the present disclosure. Reference may be made to the above embodiments of the pixel drive circuit for implementation of the display apparatus, which will not be repeated herein.

Figure 5:
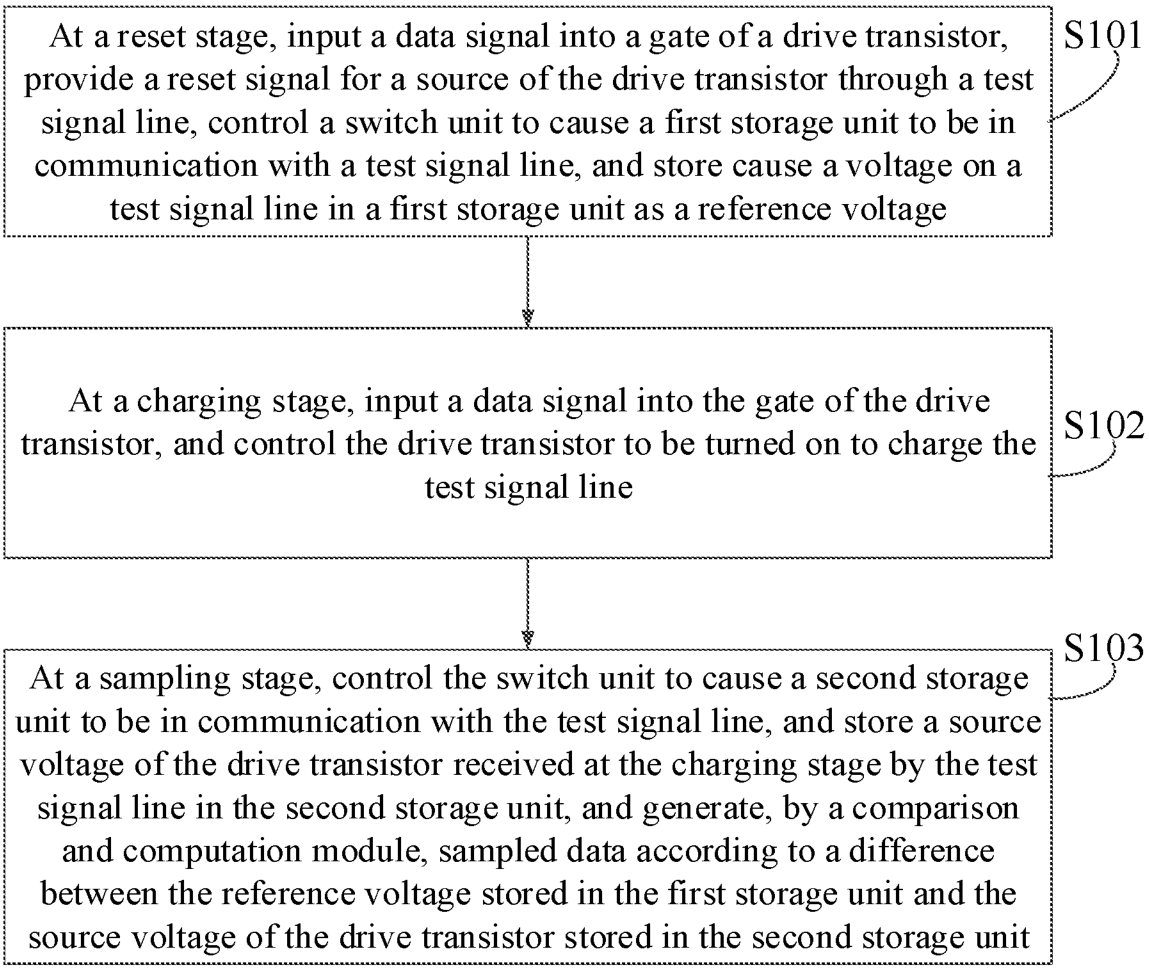
FIG. 5 is a schematic diagram of a pixel compensation method according to an embodiment of the present disclosure.

An embodiment of the present disclosure provides a method for driving a pixel compensation circuit. As shown in FIG. 5, the method includes:

S101, at a reset stage, a data signal is input into a gate of a drive transistor, a reset signal is provided for a source of the drive transistor through a test signal line, and a switch unit is controlled to cause a first storage unit to be in communication with the test signal line, and store a voltage on the test signal line in the first storage unit as a reference voltage;

S102, at a charging stage, a data signal is input into the gate of the drive transistor, and the drive transistor is controlled to be turned on to charge the test signal line; and

S103, at a sampling stage, the switch unit is controlled to cause a second storage unit to be in communication with the test signal line, and store a source voltage of the drive transistor received at the charging stage by the test signal line in the second storage unit, and a comparison and computation module generates sampled data according to a difference between the reference voltage stored in the first storage unit and the source voltage of the drive transistor stored in the second storage unit.

The embodiment of the present disclosure provides the method for driving the pixel compensation circuit. One frame includes a reset stage, a charging stage and a sampling stage. The first storage unit stores the voltage on the test signal line SL as the reference voltage at the reset stage, the second storage unit stores the source voltage of the drive transistor DTFT at the sampling stage, that is, the voltage on the test signal line SL is collected twice in one frame, the comparison and computation module generates, at the sampling stage, the sampled data according to the difference between the reference voltage stored in the first storage unit and the source voltage of the drive transistor DTFT stored in the second storage unit, and then the compensation signal of the drive transistor may be determined according to the sampled data. Since the voltage of the test signal line SL is collected and stored in one frame separately, there is no variation in influence of a parasitic capacitive effect in the pixel compensation circuit or circuit noise on the test signal line SL when the first storage unit and the second storage unit collect the voltage, such that influence of the test signal line SL on voltage collection may be eliminated, sampling precision may be improved, precision of compensation for the drive transistor may be improved accordingly, and display quality and user experience may be improved.

In some embodiments, the pixel drive circuit further includes a sampling capacitor, and at a charging stage, the method includes: the test signal line is charged, and further includes:

the sampling capacitor is charged.

In some embodiments, the switch unit includes a first one-way control switch and a second one-way control switch;

the step at a reset stage, controlling a switch unit to cause a first storage unit to be in communication with the test signal line, specifically includes:

controlling the first one-way control switch to be switched on, and controlling the second one-way control switch simultaneously to be switched off, so as to cause the first storage unit to be in communication with the test signal line; and the step at a sampling stage, controlling the switch unit to cause a second storage unit to be in communication with the test signal line, specifically includes:

controlling the first one-way control switch to be switched off, and controlling the second one-way control switch simultaneously to be switched on, so as to cause the second storage unit to be in communication with the test signal line.

In some embodiments, the switch unit includes a first one-way control switch and a multi-way selector switch;

the step at a reset stage, controlling a switch unit to cause a first storage unit to be in communication with the test signal line, specifically includes:

controlling the first one-way control switch to be switched on, and controlling an input end and a first output end of the multi-way selector switch simultaneously to be in communication, so as to cause the first storage unit to be in communication with the test signal line; and the step at a sampling stage, controlling the switch unit to cause a second storage unit to be in communication with the test signal line, specifically includes:

controlling the first one-way control switch to be switched on, and controlling the input end and a second output end of the multi-way selector switch simultaneously to be in communication, so as to cause the second storage unit to be in communication with the test signal line.

In some embodiments, the pixel drive circuit further includes a data writing transistor and a sensing transistor;

the step at a reset stage, inputting a data signal into a gate of a drive transistor, specifically includes:

loading a first level signal onto a first scanning signal end to turn on the data writing transistor, and loading the data signal onto a data signal end, so as to input the data signal into the gate of the drive transistor;

providing a reset signal for a source of the drive transistor through a test signal line, specifically includes:

loading the first level signal onto a second scanning signal end to turn on the sensing transistor, and providing the reset signal for the test signal line, so as to input the reset signal into the source of the drive transistor.

In some embodiments, the step at a charging stage, inputting a data signal into the gate of the drive transistor to turn on the drive transistor to charge the test signal line, specifically includes:

loading a first level signal onto a first scanning signal end and a second scanning signal end, turning on the data writing transistor and the sensing transistor, and loading the data signal onto the data signal end, such that the data signal is input into the gate of the drive transistor, and the test signal line is charged through the sensing transistor.

In some embodiments, the method further includes:

loading a second level signal onto the first scanning signal end and the second scanning signal end to switch off the data writing transistor and the sensing transistor at the sampling stage.

It should be noted that the first level signal is a signal for controlling the transistor to be switched on, and the second level signal is a signal for controlling the transistor to be switched off. One of the first level signal and the second level signal is a high level signal, and the other is a low level signal. The high level signal needs to be selected according to a type of transistor specifically. For example, in the compensation method according to the embodiment of the present disclosure, the first level signal is the high level signal and the second level signal is the low level signal.

Figure 6:
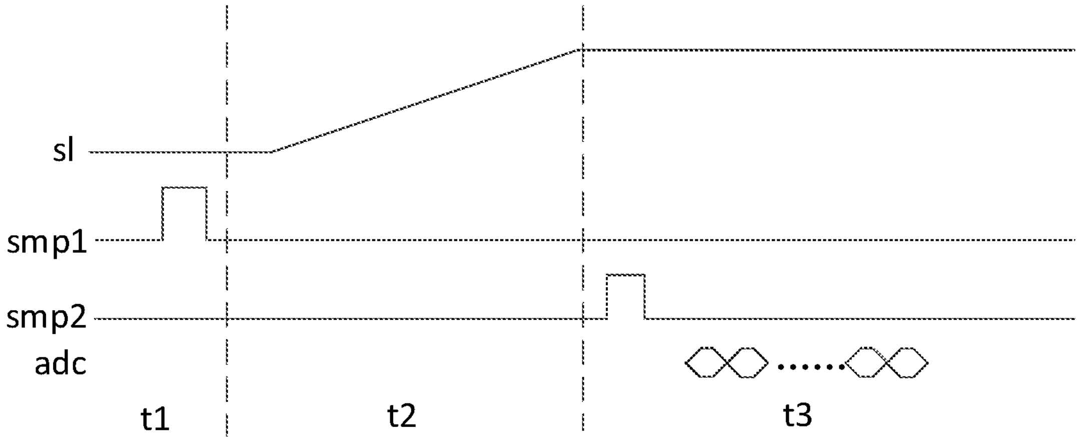
FIG. 6 is a timing diagram of a pixel compensation circuit according to an embodiment of the present disclosure.

Next, the pixel compensation circuit shown in FIG. 3 is taken as an example for illustrating the pixel compensation method according to the embodiment of the present disclosure, a corresponding timing diagram is shown in FIG. 6, and in the figure, 's1' represents a voltage signal of a test signal line, 'smp1' represents a first one-way control switch control signal, 'smp2' represents a second one-way control switch control signal, and 'adc' represents a sampled data signal generated by the differential analog-to-digital converter. The pixel compensation method includes:

S201, at a reset stage t1, a first level signal is loaded onto a first scanning signal end GT1, a data writing transistor TFT1 is controlled to be turned on, a data signal is loaded onto a data signal end DT, such that the data signal is input into a gate of a drive transistor DTFT, the first level signal is loaded onto a second scanning signal end GT2, the sensing transistor TFT2 is controlled to be turned on, a reset signal is provided for a source of the drive transistor DTFT through a test signal line SL, a first one-way control switch SMP1 is controlled to be switched on, a second one-way control switch SMP2 is controlled to be switched off, and a data signal transmitted by the test signal line SL is stored in a first storage capacitor C1;

S202, at a charging stage t2, the data writing transistor TFT1 and the sensing transistor TFT2 keep being switched on, a sampling capacitor Cs is charged, and the first one-way control switch SMP1 and the second one-way control switch SMP2 are controlled to be switched off; and S203, at a sampling stage t3, a second level signal is loaded onto the first scanning signal end GT1, the data writing transistor TFT1 is controlled to be switched off, the second level signal is loaded onto the second scanning signal end GT2, the sensing transistor TFT2 is controlled to be switched off, the first one-way control switch SMP1 is controlled to be switched off, the second one-way control switch SMP2 is controlled to be switched on, a voltage stored in the sampling capacitor Cs is transmitted through the test signal line SL and stored in a second storage capacitor C2, and the differential analog-to-digital converter ADC preforms differential processing on voltage stored in the first storage capacitor 1C and the second storage capacitor C2, so as to obtain sampled data.

Next, the pixel compensation circuit shown in FIG. 4 is taken as an example for illustrating the pixel compensation method according to embodiments of the present disclosure. The pixel compensation method includes:

S301, at a reset stage t1, a first level signal is loaded onto a first scanning signal end GT1, a data writing transistor TFT1 is controlled to be turned on, a data signal is loaded onto a data signal end DT, such that the data signal is input into a gate of a drive transistor DTFT, the first level signal is loaded onto a second scanning signal end GT2, the sensing transistor TFT2 is controlled to be turned on, a reset signal is provided for a source of the drive transistor DTFT through a test signal line SL, a first one-way control switch SMP1 is controlled to be switched on, an input end and a first output end of a multi-way selector switch SW are controlled to be in communication, and a data signal transmitted by the test signal line SL is stored in a first storage capacitor C1;

S302, at a charging stage t2, the data writing transistor TFT1 and the sensing transistor TFT2 are kept switched on, a sampling capacitor Cs is charged, and the first one-way control switch SMP1 is controlled to be switched off; and S203, at a sampling stage t3, a second level signal is loaded onto the first scanning signal end GT1, the data writing transistor TFT1 is controlled to be switched off, the second level signal is loaded onto the second scanning signal end GT2, the sensing transistor TFT2 is controlled to be switched off, the first one-way control switch SMP1 is controlled to be switched on, the input end and a second output end of the multi-way selector switch SW are controlled to be in communication, a voltage stored in the sampling capacitor Cs is transmitted through the test signal line SL and stored in a second storage capacitor C2, and the differential analog-to-digital converter ADC performs differential processing on voltage stored in the first storage capacitor 1C and the second storage capacitor C2, so as to obtain sampled data.

In some embodiments, after the sampling stage, the method further includes:

at a compensation stage, compensating for a data signal of a pixel drive circuit is performed according to the sampled data.

During specific implementation, the timing control module determines the compensation signal, such as a compensation signal of the data signal, according to a correspondence between preset sampled data and the compensation data, and provides a data signal after compensation for the pixel drive circuit according to the compensation signal.

To sum up, some embodiments of the present disclosure provide the pixel compensation circuit, the method for driving same, and the display apparatus. The pixel compensation circuit includes the first storage unit and the second storage unit, the first storage unit stores the voltage on the test signal line SL as the reference voltage at the reset stage, the second storage unit stores the source voltage of the drive transistor DTFT at the sampling stage, the comparison and computation module generates the sampled data according to the difference between the reference voltage stored in the first storage unit and the source voltage of the drive transistor DTFT stored in the second storage unit, and then the compensation signal of the drive transistor may be determined according to the sampled data. Since the first storage unit and the second storage unit collect and store the voltage of the test signal line SL in one frame respectively, there is no variation in influence of an parasitic capacitive effect in the pixel compensation circuit or circuit noise on the test signal line SL when the first storage unit and the second storage unit collect the voltage, such that influence of the test signal line SL on voltage collection may be eliminated, sampling precision may be improved, precision of compensation for the drive transistor may be improved accordingly, and display quality and user experience may be improved.

Apparently, those skilled in the art can make various modifications and variations to the present disclosure without departing from the spirit and scope of the present disclosure. Thus, it is intended that the present disclosure should encompass such modifications and variations that fall within the scope of the appended claims of the present disclosure and their equivalents, as well.

What is claimed is:

1. A pixel compensation circuit, comprising:

a pixel drive circuit comprising a drive transistor;

a test signal line coupled to the pixel drive circuit, the test signal line is configured to provide a reset signal for a source of the drive transistor at a reset stage and configured to receive a source voltage of the drive transistor at a charging stage after the reset stage;

a sampling circuit comprising a switch unit coupled to the test signal line, and a first storage unit coupled to the switch unit and a second storage unit coupled to the switch unit, wherein the switch unit is configured to cause the first storage unit to be in communication with the test signal line at the reset stage, so as to cause the first storage unit to store a voltage on the test signal line as a reference voltage, and cause the second storage unit to be in communication with the test signal line at a sampling stage after the charging stage, so as to cause the second storage unit to store a source voltage of the drive transistor; and a comparison and computation circuit coupled to the first storage unit and the second storage unit, and the comparison and computation circuit is configured to generate sampled data at the sampling stage according to a difference between the reference voltage stored in the first storage unit and the source voltage of the drive transistor stored in the second storage unit.

2. The pixel compensation circuit according to claim 1, further comprising:

a sampling capacitor configured to store the source voltage of the drive transistor received by the test signal line at the charging stage, wherein a first pole of the sampling capacitor is coupled to the test signal line, and a second pole of the sampling capacitor is grounded.

3. The pixel compensation circuit according to claim 1 or 2, wherein the first storage unit comprises:

a first storage capacitor, a first pole of the first storage capacitor being coupled to the switch unit and a first input end of the comparison and computation circuit, and a second pole of the first storage capacitor being grounded; and the second storage unit comprises:

a second storage capacitor, a first pole of the second storage capacitor being coupled to the switch unit and a second input end of the comparison and computation circuit, and a second pole of the second storage capacitor being grounded.

4. The pixel compensation circuit according to claim 1 or 2, wherein the switch unit comprises:

a first one-way control switch, a first end of the first one-way control switch being coupled to the test signal line, and a second end of the first one-way control switch being coupled to the first storage unit; and a second one-way control switch, a first end of the second one-way control switch being coupled to the test signal line, and a second end of the second one-way control switch being coupled to the second storage unit.

5. The pixel compensation circuit according to claim 1 or 2, wherein the switch unit comprises:

a first one-way control switch, a first end of the first one-way control switch being coupled to the test signal line; and a multi-way selector switch, wherein an input end of the multi-way selector switch is coupled to a second end of the first one-way control switch, the multi-way selector switch comprises a first output end and a second output end, the first output end is coupled to the first storage unit, and the second output end is coupled to the second storage unit.

6. The pixel compensation circuit according to claim 1 or 2, wherein the comparison and computation circuit comprises:

a differential digital-to-analog converter, wherein a first input end of the differential digital-to-analog converter is coupled to the first storage unit, a second input end of the differential digital-to-analog converter is coupled to the second storage unit, and the differential digital-to-analog converter is configured to perform differential processing on the reference voltage stored in the first storage unit and the source voltage of the drive transistor stored in the second storage unit to generate the sampled data.

7. The pixel compensation circuit according to claim 1, further comprising:

a data writing transistor, a gate of the data writing transistor being coupled to a first scanning signal end, a source of the data writing transistor being coupled to a data signal end, and a drain of the data writing transistor being coupled to a gate of the drive transistor;

a sensing transistor, a gate of the sensing transistor being coupled to a second scanning signal end, a source of the sensing transistor being coupled to the test signal line, and a drain of the sensing transistor being coupled to the source of the drive transistor;

a third storage capacitor, a first pole of the third storage capacitor being coupled to the gate of the drive transistor, and a second pole of the third storage capacitor being coupled to the source of the drive transistor; and a light-emitting device, an anode of the light-emitting device being coupled to the source of the drive transistor.

8. The pixel compensation circuit according to claim 1, further comprising:

a timing control circuit coupled to the comparison and computation circuit, and the timing control circuit is configured to generate a compensation signal according to sampled data obtained by the comparison and computation circuit and provide a data signal for the pixel drive circuit according to the compensation signal.

9. A display apparatus, comprising a pixel compensation circuit, wherein the pixel compensation circuit comprises:

a pixel drive circuit comprising a drive transistor;

a test signal line coupled to the pixel drive circuit, the test signal line is configured to provide a reset signal for a source of the drive transistor at a reset stage and configured to receive a source voltage of the drive transistor at a charging stage after the reset stage;

a sampling circuit comprising a switch unit coupled to the test signal line, and a first storage unit coupled to the switch unit and a second storage unit coupled to the switch unit, wherein the switch unit is configured to cause the first storage unit to be in communication with the test signal line at the reset stage, so as to cause the first storage unit to store a voltage on the test signal line as a reference voltage, and cause the second storage unit to be in communication with the test signal line at a sampling stage after the charging stage, so as to cause the second storage unit to store a source voltage of the drive transistor; and a comparison and computation circuit coupled to the first storage unit and the second storage unit, and the comparison and computation circuit is configured to generate sampled data at the sampling stage according to a difference between the reference voltage stored in the first storage unit and the source voltage of the drive transistor stored in the second storage unit.

10. A method for driving the pixel compensation circuit according to claim 1, comprising:

at a reset stage, inputting a data signal into a gate of a drive transistor, providing a reset signal for a source of the drive transistor through a test signal line, and controlling a switch unit to cause a first storage unit to be in communication with the test signal line, and storing a voltage on the test signal line in the first storage unit as a reference voltage;

at a charging stage, inputting a data signal into the gate of the drive transistor, and turning on the drive transistor to charge the test signal line; and at a sampling stage, controlling the switch unit to cause a second storage unit to be in communication with the test signal line, and storing a source voltage of the drive transistor received at the charging stage by the test signal line in the second storage unit, and generating, by a comparison and computation circuit, sampled data according to a difference between the reference voltage stored in the first storage unit and the source voltage of the drive transistor stored in the second storage unit.

11. The method according to claim 10, wherein the pixel drive circuit further comprises a sampling capacitor; and at the charging stage, the method comprises: charging the test signal line, and further comprises:

charging the sampling capacitor.

12. The method according to claim 10, wherein the switch unit comprises a first one-way control switch and a second one-way control switch;

at a reset stage, the controlling a switch unit to cause a first storage unit to be in communication with the test signal line, comprises:

switching on the first one-way control switch, and switching off the second one-way control switch, so as to cause the first storage unit to be in communication with the test signal line; and at a sampling stage, the controlling the switch unit to cause a second storage unit to be in communication with the test signal line, comprises:

switching off the first one-way control switch, and simultaneously controlling the second one-way control switch to be switched on, so as to cause the second storage unit to be in communication with the test signal line.

13. The method according to claim 10, wherein the switch unit comprises a first one-way control switch and a multi-way selector switch;

at a reset stage, the controlling a switch unit to cause a first storage unit to be in communication with the test signal line, comprises:

switching on the first one-way control switch, and controlling an input end and a first output end of the multi-way selector switch to be in communication, so as to cause the first storage unit to be in communication with the test signal line; and at a sampling stage, the controlling the switch unit to cause a second storage unit to be in communication with the test signal line, comprises:

switching on the first one-way control switch and controlling the input end and a second output end of the multi-way selector switch to be in communication, so as to cause the second storage unit to be in communication with the test signal line.

14. The method according to claim 10, wherein the pixel drive circuit further comprises a data writing transistor and a sensing transistor;

at a reset stage, the inputting a data signal into a gate of a drive transistor, comprises:

loading a first level signal onto a first scanning signal end, turning on the data writing transistor, and loading the data signal onto a data signal end, so as to input the data signal into the gate of the drive transistor;

the providing a reset signal for a source of the drive transistor through a test signal line, comprises:

loading the first level signal onto a second scanning signal end, turning on the sensing transistor, and providing the reset signal for the test signal line, so as to input the reset signal into the source of the drive transistor.

15. The method according to claim 10, wherein after the sampling stage, the method further comprises:

at a compensation stage, compensating for a data signal of a pixel drive circuit according to the sampled data.

16. The display apparatus according to claim 9, wherein the pixel compensation circuit further comprising:

a sampling capacitor configured to store the source voltage of the drive transistor received by the test signal line at the charging stage, wherein a first pole of the sampling capacitor is coupled to the test signal line, and a second pole of the sampling capacitor is grounded.

17. The display apparatus according to claim 9, wherein the first storage unit comprises:

a first storage capacitor, a first pole of the first storage capacitor being coupled to the switch unit and a first input end of the comparison and computation circuit, and a second pole of the first storage capacitor being grounded; and the second storage unit comprises:

a second storage capacitor, a first pole of the second storage capacitor being coupled to the switch unit and a second input end of the comparison and computation circuit, and a second pole of the second storage capacitor being grounded.

18. The display apparatus according to claim 9, wherein the switch unit comprises:

a first one-way control switch, a first end of the first one-way control switch being coupled to the test signal line, and a second end of the first one-way control switch being coupled to the first storage unit; and a second one-way control switch, a first end of the second one-way control switch being coupled to the test signal line, and a second end of the second one-way control switch being coupled to the second storage unit.

19. The display apparatus according to claim 9, wherein the switch unit comprises:

a first one-way control switch, a first end of the first one-way control switch being coupled to the test signal line; and a multi-way selector switch, wherein an input end of the multi-way selector switch is coupled to a second end of the first one-way control switch, the multi-way selector switch comprises a first output end and a second output end, the first output end is coupled to the first storage unit, and the second output end is coupled to the second storage unit.

20. The display apparatus according to claim 9, wherein the comparison and computation circuit comprises:

a differential digital-to-analog converter, wherein a first input end of the differential digital-to-analog converter is coupled to the first storage unit, a second input end of the differential digital-to-analog converter is coupled to the second storage unit, and the differential digital-to-analog converter is configured to perform differential processing on the reference voltage stored in the first storage unit and the source voltage of the drive transistor stored in the second storage unit to generate the sampled data.

* * * * *